United States Patent
Ryu et al.

(10) Patent No.: US 9,225,034 B2
(45) Date of Patent: Dec. 29, 2015

(54) STEPWISE ELECTRODE ASSEMBLY HAVING VARIOUSLY-SHAPED CORNER AND SECONDARY BATTERY, BATTERY PACK AND DEVICE COMPRISING THE SAME

(71) Applicant: LG Chem, Ltd., Seoul (KR)

(72) Inventors: Seung-Min Ryu, Chungcheongnam-do (KR); Sung-Jin Kwon, Daejeon (KR); Soon-Ho Ahn, Seoul (KR); Dong-Myung Kim, Daejeon (KR); Ki-Woong Kim, Daejeon (KR); Young-Hun Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/062,251

(22) Filed: Oct. 24, 2013

(65) Prior Publication Data

US 2014/0050959 A1     Feb. 20, 2014

Related U.S. Application Data

(63) Continuation of application No. PCT/KR2013/002150, filed on Mar. 15, 2013.

(30) Foreign Application Priority Data

May 29, 2012  (KR) .......... 10-2012-0056919
Nov. 9, 2012   (KR) .......... 10-2012-0127029
Mar. 15, 2013  (KR) .......... 10-2013-0028333

(51) Int. Cl.
*H01M 10/04*     (2006.01)
*H01M 4/139*     (2010.01)
(Continued)

(52) U.S. Cl.
CPC .......... *H01M 10/0431* (2013.01); *H01M 4/139* (2013.01); *H01M 10/0413* (2013.01);
(Continued)

(58) Field of Classification Search
CPC .............. H01M 10/0431; H01M 10/0413; H01M 10/0436; H01M 10/052; H01M 10/0587; H01M 10/0463
See application file for complete search history.

(56) References Cited

U.S. PATENT DOCUMENTS

| | | | |
|---|---|---|---|
| 3,442,717 A | 5/1969 | Horn et al. | |
| 4,964,877 A | 10/1990 | Keister et al. | |

(Continued)

FOREIGN PATENT DOCUMENTS

| | | |
|---|---|---|
| CN | 101107736 A | 1/2008 |
| EP | 1309018 A2 | 5/2003 |

(Continued)

OTHER PUBLICATIONS

International Search Report corresponding to PCT/KR2013/002150, dated Jun. 14, 2013.

(Continued)

*Primary Examiner* — Helen O Conley
(74) *Attorney, Agent, or Firm* — Lerner, David, Littenberg, Krumholz & Mentlik, LLP

(57) ABSTRACT

There is provided an electrode assembly having steps including: a first electrode stair including at least one first electrode unit; and a second electrode stair including at least one second electrode unit having an area different from that of the first electrode unit, wherein the first electrode stair and the second electrode stair are stacked to be adjacent, separated by at least one separator as a boundary therebetween and including one or more electrode laminates having steps formed by a difference between areas of the first electrode stair and the second electrode stair, and shapes of the corners of the first electrode stair and the second electrode stair having steps are different. There is also provided a secondary battery including the electrode assembly. Secondary batteries having various designs without restriction in shapes of corners of electrode units can be provided.

32 Claims, 15 Drawing Sheets

(51) Int. Cl.
  *H01M 10/052* (2010.01)
  *H01M 10/0587* (2010.01)

(52) U.S. Cl.
  CPC ...... *H01M10/0436* (2013.01); *H01M 10/0463* (2013.01); *H01M 10/052* (2013.01); *H01M 10/0587* (2013.01); *Y02E 60/122* (2013.01); *Y10T 29/49117* (2015.01)

(56) References Cited

U.S. PATENT DOCUMENTS

| | | | |
|---|---|---|---|
| 5,633,097 | A | 5/1997 | Miller |
| 5,652,074 | A | 7/1997 | Larson, III et al. |
| 6,224,995 | B1 | 5/2001 | Fauteux et al. |
| 6,498,951 | B1 | 12/2002 | Larson et al. |
| 6,610,443 | B2 | 8/2003 | Paulot et al. |
| 6,946,220 | B2 | 9/2005 | Probst et al. |
| 7,479,349 | B2 | 1/2009 | O'Phelan et al. |
| 7,595,132 | B2 | 9/2009 | Kang et al. |
| 2001/0005561 | A1 | 6/2001 | Yamada et al. |
| 2002/0160257 | A1 | 10/2002 | Lee et al. |
| 2003/0077509 | A1 | 4/2003 | Probst et al. |
| 2005/0164094 | A1 | 7/2005 | Kotato et al. |
| 2005/0214642 | A1 | 9/2005 | Kim et al. |
| 2006/0275661 | A1 | 12/2006 | Kim et al. |
| 2006/0286456 | A1 | 12/2006 | Fu et al. |
| 2007/0054180 | A1 | 3/2007 | Miyajima et al. |
| 2007/0287064 | A1 | 12/2007 | Suzuki et al. |
| 2008/0137890 | A1 | 6/2008 | Petersen et al. |
| 2009/0075168 | A1 | 3/2009 | Lee |
| 2009/0159582 | A1 | 6/2009 | Chami et al. |
| 2010/0112451 | A1 | 5/2010 | Shibutani et al. |
| 2011/0183183 | A1 | 7/2011 | Grady et al. |
| 2011/0274955 | A1 | 11/2011 | Park et al. |
| 2011/0287308 | A1 | 11/2011 | Kim et al. |
| 2012/0015223 | A1 | 1/2012 | Bhardwaj et al. |
| 2012/0015236 | A1 | 1/2012 | Spare |
| 2012/0135299 | A1 | 5/2012 | Kwon et al. |
| 2012/0156551 | A1 | 6/2012 | Cho |
| 2013/0144167 | A1 | 6/2013 | Lee et al. |

FOREIGN PATENT DOCUMENTS

| | | | | |
|---|---|---|---|---|
| EP | 1326680 | A1 | 7/2003 | |
| JP | 02-056856 | * | 2/1990 | ............. H01M 4/04 |
| JP | 09-260209 | * | 9/1994 | ............. H01M 10/12 |
| JP | 09-082361 | | 3/1997 | |
| JP | 10-270014 | * | 10/1998 | ............. H01M 4/02 |
| JP | H-10296879 | A | 11/1998 | |
| JP | 2000133317 | A | 5/2000 | |
| JP | 2001-028275 | A | 1/2001 | |
| JP | 2001167743 | A | 6/2001 | |
| JP | 2002-199910 | A | 7/2002 | |
| JP | 2003217601 | A | 7/2003 | |
| JP | 2004111219 | A | 4/2004 | |
| JP | 3611765 | B2 | 1/2005 | |
| JP | 2005169728 | A | 6/2005 | |
| JP | 3680797 | B2 | 8/2005 | |
| JP | 2006127882 | A | 5/2006 | |
| JP | 2006134604 | A | 5/2006 | |
| JP | 2006-278331 | A | 10/2006 | |
| JP | 2009-218105 | A | 9/2009 | |
| KR | 20-0207948 | | 1/2001 | |
| KR | 1020010055968 | A | 7/2001 | |
| KR | 20010104150 | A | 11/2001 | |
| KR | 10-2003-0066960 | A | 8/2003 | |
| KR | 20050020357 | A | 3/2005 | |
| KR | 20050036466 | A | 4/2005 | |
| KR | 100670492 | B1 | 1/2007 | |
| KR | 10-2007-0066401 | A | 6/2007 | |
| KR | 1020070075941 | A | 7/2007 | |
| KR | 1020070099068 | A | 10/2007 | |
| KR | 100829553 | B1 | 5/2008 | |
| KR | 20080058772 | A | 6/2008 | |
| KR | 20080095967 | A | 10/2008 | |
| KR | 10-0866767 | B1 | 11/2008 | |
| KR | 20090003823 | A | 1/2009 | |
| KR | 20090028243 | A | 3/2009 | |
| KR | 10-2009-0062409 | A | 6/2009 | |
| KR | 20100137290 | A | 12/2010 | |
| KR | 10-2011-0105737 | A | 9/2011 | |
| KR | 20110112241 | A | 10/2011 | |
| KR | 20110128594 | A | 11/2011 | |
| KR | 20120060706 | A | 6/2012 | |
| WO | 0072392 | A1 | 11/2000 | |
| WO | 2012/009423 | A1 | 1/2012 | |
| WO | 2012053772 | A2 | 4/2012 | |
| WO | 2013-180378 | A1 | 12/2013 | |

OTHER PUBLICATIONS

Chinese Office Action for Application No. 201380002792.X dated Apr. 3, 2015.
International Search Report for Application No. PCT/KR2013/002118 dated Jun. 28, 2013.
Inernational Search Report for Application No. PCT/KR2013/001815 dated Jun. 27, 2013.
International Search Report for Application No. PCT/KR2013/002127 dated Jun. 27, 2013.
Machine translation of KR 2003-0066960 (Jang).

\* cited by examiner

STEPWISE ELECTRODE ASSEMBLY HAVING VARIOUSLY-SHAPED CORNER AND SECONDARY BATTERY, BATTERY PACK AND DEVICE COMPRISING THE SAME

CROSS-REFERENCE TO RELATED APPLICATIONS

This application is a continuation of International Application No. PCT/KR2013/002150 filed on Mar. 15, 2013, which claims priority to Korean Patent Application Nos. 10-2012-0056919 filed on May 29, 2012, 10-2012-0127029 filed on Nov. 9, 2012, and 10-2013-0028333 filed on Mar. 15, 2013, in the Korean Intellectual Property Office, the disclosures of which are incorporated herein by reference.

BACKGROUND OF THE INVENTION

1. Field of the Invention

The present invention relates to an electrode assembly having steps, and more particularly, to an electrode assembly having steps in at least one corner portion thereof.

The present invention also relates to a secondary battery, a battery pack, and a device including the electrode assembly having steps.

2. Description of the Related Art

Recently, due to the technological development of mobile devices and increasing demand therefor, demand for rechargeable batteries (or secondary batteries) have rapidly increased. Accordingly, a secondary lithium battery having high energy density and a high operating voltage, as well as excellent charge and life span characteristics, has been widely used as an energy source of various electronic products as well as various mobile devices.

In general, a secondary lithium battery has a structure in which an electrode assembly and electrolyte are hermetically sealed within a battery case, and may be classified as a cylindrical battery, an angular battery, a prismatic battery, a pouch-type battery, or the like, according to appearance, and may be classified as a lithium ion battery, a lithium ion polymer battery, a lithium polymer battery, or the like, according to a type of electrolyte used therein.

Due to the recent trend for reductions in the size of mobile devices, demand for thin prismatic batteries and pouch-type batteries has been on the rise, and in particular, interest in lightweight pouch-type batteries has been increased.

In particular, mobile devices have been increasingly reduced in size and diversified in design. With a technology environment changing, a shape of a battery having conventional electrode units stacked therein does not correspond to a mobile device in terms of shape, resulting in a failure of effective utilization of internal space of the mobile device. Thus, batteries installed in mobile devices are required to have various shapes.

Hence, demand for batteries having steps has been increased. A shape of a battery having steps may maximally correspond to that of a device according to a shape thereof, minimizing dead space within the device, and thus, the device may be effectively filled with the secondary battery to increase overall battery capacity.

Meanwhile, recently, mobile devices having various designs incorporating rounded corners have been launched, and in order to be installed in such devices, demand for secondary batteries having rounded corners fitting the design of devices has increased.

In addition, the manufacture of multiple electrodes for an electrode assembly often occurs by producing multiple of the electrodes from a single sheet of material. Current processes for cutting or removing the electrodes from the material suffer from inefficiencies. One of those inefficiencies is the output of one or more electrodes that do not have the intended perimeter configuration for assembly into the battery cell. Specifically, the perimeter of the electrodes can include undesirable edge protrusions. These inefficiencies can slow and add cost to the process of manufacturing and assembling a battery cell according to the present invention.

Therefore, electrode units for providing a battery that may be able to be variously designed are required to be provided, and a method for promoting enhancement productivity by reducing a defect rate during an electrode unit fabrication process is required.

An aspect of the present invention provides an electrode assembly capable of providing secondary batteries having various designs without being restricted by a shape of a corner portion of an electrode unit.

An aspect of the present invention also provides a secondary battery, a battery pack, and a device including the foregoing electrode assembly.

SUMMARY OF THE INVENTION

According to an aspect of the present invention, there is provided an electrode assembly having steps having various corner shapes, including: a first electrode stair including at least one first electrode unit; and a second electrode stair including at least one second electrode unit having an area different from that of the first electrode unit, wherein the first electrode stair and the second electrode stair are stacked to be adjacent, separated by at least one separator as a boundary therebetween, and include one or more electrode laminates having steps formed by a difference between areas of the first electrode stair and the second electrode stair, and shapes of the corners of the first electrode stair and the second electrode stair having steps are different.

At least one stair forming the electrode laminate may have a rounded corner forming a step.

The first electrode stair and the second electrode stair forming the electrode laminate may have rounded corners forming steps, and curvatures of the rounded corners may be different.

In the electrode laminate, the first electrode stair and the second electrode stair may share at least two sides and three corners, may share at least two sides and two corners, may share at least one side and two corners, may share at least one side and one corner, may share at least one corner, or may share only a portion of one side. In addition, in the electrode laminate, the first electrode stair may be stacked within a surface of the second electrode stair, and have steps in all the sides and corners. Also, in the electrode laminate, the first electrode stair may share at least two sides of the second electrode stair, and all corners thereof may have steps.

Also, in the electrode laminate, the electrode units may be stacked such that the areas thereof are reduced in a height direction in which the electrode units are stacked. In the electrode laminate, one of mutually adjacent electrode units may be included within a stacked surface of the other electrode unit.

The electrode units may have electrode tabs corresponding to respective electrodes, the sizes of the electrode tabs may be equal or different, and the electrode tabs may be attached to one end portion of the electrode unit or facing end portions of the electrode unit. The electrode unit can be independently selected from the group consisting of a negative electrode, a positive electrode, and a unit cell alternately stacked with at least one negative electrode, and at least one positive electrode with a separator interposed therebetween. The unit cell can be selected from the group consisting of a jelly roll-type unit cell, a stacked-type unit cell, and a stacked-and-folded-type unit cell, independently. The unit cell can include at least one step.

In the electrode assembly, facing electrodes of the electrode unit and the adjacent electrode unit having different areas which face each other with the separator interposed therebetween as a boundary may have different polarities. Also, a facing electrode of an electrode unit having a larger area, between the electrode unit and the adjacent electrode unit having different areas, may be a negative electrode.

According to another aspect of the present invention, there is provided a secondary battery in which the electrode assembly is received in a battery case. The secondary battery may be a lithium ion secondary battery or a lithium ion polymer secondary battery.

In this case, the battery case may be a pouch-type case, and the battery case may receive the electrode assembly such that it is tightly attached to a surface of the electrode assembly, and may have a step or a sloped surface corresponding to a shape of the electrode assembly.

According to another aspect of the present invention, there is provided a device including one or more of the secondary batteries. A system component of the device may be positioned in a surplus space of the secondary battery. The device may be a portable phone, a portable computer, a smart phone, a smart pad, a net book, a light electronic vehicle (LEV), an electric vehicle, a hybrid electric vehicle, a plug-in hybrid electric vehicle, or a power storage device.

According to at least one implementation example of the present invention, curvatures of corners of a secondary battery having steps may be sequentially increased or decreased according to stacking order of the electrode units or irregularly provided, so as to implement batteries having various designs without being restricted to a corner shape, and a cell having a three-dimensional cubic form, different from an existing cell can be obtained.

Also, according to at least one implementation example of the present invention, a process for providing corners of electrode units with the same curvature can be eliminated or process precision is not required to be maintained, promoting process simplification, reducing a defect rate and the discard, and thus, economic feasibility is high and productivity of the electrode assembly can be enhanced.

In addition, according to at least one implementation example of the present invention, since facilities for fabricating an electrode unit having the same shape as that of the related art can be utilized as is, installation costs can be reduced.

Moreover, according to at least one implementation example of the present invention, in fabricating an electrode unit having a certain curvature, a portion, cut out to be removed according to a curvature shape in the related art, may remain in the electrode unit to be active in a battery reaction, improving a battery capacity.

DETAILED DESCRIPTION OF THE INVENTION

Figure 1:
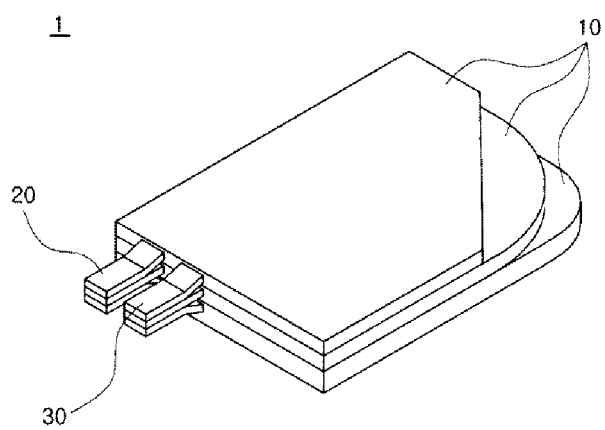
FIGS. 1 through 3 are perspective views of electrode assemblies in which at least two sides and at least three corners are shared and at least one corner has a step.

Hereinafter, embodiments of the present invention will be described in detail with reference to the accompanying drawings. However, drawings included herein are illustrative drawings provided to help understand the present invention merely as an embodiment of the present invention and the scope of the present invention is not limited thereto. Some components may be exaggerated, reduced, or omitted to allow the present invention to be easily understood.

The inventors of the present application completed the present invention upon discovering that, in implementing a battery in which at least one corner has a step with curvature, batteries having various shapes may be implemented without being limited to the shape of corners, based on curvature relationships of corners of electrode units having different areas.

According to an embodiment of the present invention, there is provided an electrode assembly including: a first electrode stair including at least one first electrode unit; and a second electrode stair including at least one second electrode unit having an area different from that of the first electrode unit, wherein the first electrode stair and the second electrode stair are stacked to be adjacent, separated by at least one separator as a boundary therebetween, and include one or more electrode laminates having steps formed by a difference between areas of the first electrode stair and the second electrode stair, and shapes of the corners of the first electrode stair and the second electrode stair having steps are different.

The electrode assembly may be formed by stacking two or more electrode units. In this case, the electrode unit may be a unit electrode of a negative electrode or a positive electrode, and may also be a unit cell in which at least one negative electrode and at least one positive electrode are alternately stacked with a separator interposed therebetween.

Meanwhile, the electrode laminate having a step may be obtained by arranging unit cells on two or more rectangular separators and folding the rectangular separators such that the rectangular separators wrap the unit cells. The unit cells may be a stacked-type unit cell, a stacked-and-folded-type unit cell, a jelly roll-type unit cell, or the like, but the present invention is not limited thereto.

The stacked-type unit cell is a unit cell formed by alternately stacking at least one positive electrode and at least one negative electrode with a separator as a boundary therebetween. Based on a minimum unit electrode stacking form in which a negative electrode and a positive electrode are stacked, the stacked-type unit cell may be classified as a mono-cell, a laminate in which a single negative electrode and a single positive electrode are stacked with a separator as a boundary therebetween, an A-type bicell, a laminate in which positive electrodes are disposed on both surfaces, a negative electrode is disposed between the positive electrodes, and the respective electrodes are separately stacked with a separator as a boundary, and a C-type bicell, a laminate in which negative electrodes are disposed on both surfaces, a positive electrode is disposed between the negative electrodes, and the respective electrodes are separately stacked with a separator as a boundary, but the present invention is not limited thereto.

In addition, the mono cell, the A-type bicell, and the C-type bicell may be stacked with separators as boundaries to use the laminate in which a plurality of negative electrodes and a plurality of positive electrodes are stacked, as an electrode unit.

Meanwhile, the stacked-and-folded-type unit cell is a unit cell obtained by folding two or more electrode units arranged on one or two or more rectangular separators in a winding manner or a Z-folding manner. Although not shown, the electrode units arranged on the rectangular separators may be a stacked-type electrode laminate, a jelly roll-type electrode laminate, a stacked-and-folded-type electrode laminate, or any combination thereof.

Also, although not shown, the unit cells arranged on the rectangular separators may be a jelly roll-type electrode laminate formed by stacking negative rectangular electrodes and positive electrodes on both surfaces of one or two or more rectangular separators and winding the same in a spiral shape.

Since the unit cells are folded by the rectangular separator, it may have a step formed due to a difference in areas in relation to another electrode unit, and in this case, the unit cell may have a step due to a difference in areas of electrode units constituting a single unit cell.

In an embodiment of the present invention, the electrode laminate according to an embodiment of the present invention may be assembled by arranging the foregoing stack-type unit cells, the stacked-and-folded-type unit cells, the jelly roll-type unit cells and a single electrode provided independently or by combining them on the rectangular separators.

In this case, the negative electrode and the positive electrode are not particularly limited and a negative electrode and a positive electrode generally used in the art may also be appropriately used in the present invention.

For example, a negative electrode formed by coating a negative electrode active material such as a lithium metal, a lithium alloy, carbon, petroleum coke, activate carbon, graphite, or the like, on both surfaces of a negative electrode current collector made of copper, nickel, a copper alloy, or any combination thereof may be used. Also, a positive electrode formed by coating a positive electrode active material such as a lithium manganese oxide, a lithium cobalt oxide, a lithium nickel oxide, or the like, on both surfaces of a positive electrode current collector made of aluminum, nickel, or a combination thereof, but the present invention is not limited thereto.

The negative electrode and the positive electrode are stacked with separators as boundaries. Here, the separators may be made of a material generally used in the art. For example, a multi-layer film made of polyethylene, polypropylene, or a combination thereof having a micro-porous structure, or a polymer film for a gel-type polymer electrolyte or a solid polymer electrolyte such as polyvinylidene fluoride, polyethylene oxide, polyacrylonitrile, or polyvinylidene fluoride hexafluoropropylene copolymer may be used, but the present invention is not particularly limited.

In an embodiment of the present invention, an electrode laminate having steps may be obtained by stacking electrodes having different areas by separators as boundaries. Here, these areas of the electrode units are different means that one electrode unit and an electrode unit adjacent thereto have structures in which either of a horizontal length and a vertical length thereof are different, and thus, the areas of the stacked electrode units are different.

For example, in one implementation example of the present invention, an electrode assembly may be formed by stacking electrode units having different widths or breadths. The difference between areas of electrode units may not be particularly limited as long as it may form steps in the electrode assembly. For example, a width or breadth of an electrode unit having a relatively small area may be 20% to 95%, preferably, 30% to 90%, of a width or breadth of an electrode unit having a relatively large area. Either of widths and breadths of the electrode units may be different, or both thereof may be different.

The electrode laminate having steps provided according to an embodiment of the present invention may be formed by stacking a first electrode stair including at least one first electrode unit and a second electrode stair including a second electrode unit having an area different from that of the first electrode unit, with a separator as a boundary. In an embodiment of the present invention, the electrode stair refers to electrode units having the same area and shape or a laminate formed by stacking a plurality of such electrode units, which does not have a step.

In an embodiment of the present invention, the first electrode stair and the second electrode stair are relative in the electrode laminate including steps. Based on a boundary surface forming a single step, any one electrode stair positioned above or below the boundary surface may be defined as a first electrode stair and the other electrode stair may be defined as a second electrode stair, and the first electrode stair and the second electrode stair may be defined as a single electrode laminate. Thus, in an embodiment of the present invention, for example, in case of an electrode assembly in which three electrode stairs having different areas are stacked to form two steps, an intermediate electrode stair may be a second electrode stair in relation to a lower electrode stair or may be a first electrode stair in relation to an upper electrode stair.

Meanwhile, the electrode assembly provided according to an embodiment of the present invention may include one or more steps. Namely, the electrode assembly may be formed by stacking two or more electrode laminates having steps. Preferably, the steps are formed in at least corners. Here, one or two or more corners may have steps, or all corners thereof may have steps.

Here, having steps in the corners may include a case in which steps are formed by only at least one corner as illustrated in FIGS. 1 through 6 or a case in which one of each of the electrode stairs has a different length such the corners adjacent to the side are not shared, as illustrated in FIGS. 7 through 11.

In an embodiment of the present invention, preferably, shapes of corners of the respective electrode stairs 10 constituting the electrode laminate are different. Since the shapes of the corners are different, the electrode assembly 1 having steps may be obtained. For example, as illustrated in FIGS. 1 through 6, steps may be formed in the electrode assembly 1 due to the difference in the shapes of the corners.

Here, the shapes of the corners may be rounded or may have various other shapes as illustrated in the drawings.

When the corners of the respective electrode stairs 10 of the electrode laminate are rounded, the corner of at least one electrode stair 10 may have a different curvature R in relation to any other adjacent electrode stair 10. While the electrode assembly 1 having steps may be formed by combining a plurality of electrode units having the same rounded corners and an electrode unit having a rounded corner with a different curvature, a corner of any one electrode unit may not be rounded.

Namely, according to an embodiment of the present invention, the electrode assembly 1 having a step in at least one corner may be obtained by arranging the electrode units having various corner shapes in various forms. In an embodiment of the present invention, steps formed by the difference in areas may have various shapes according to sides of the stacked electrode units or forms of the stacked electrode units in which the corners are shared.

In an embodiment of the present invention, the sharing refers that a first electrode stair 10 and a second electrode stair 10 stacked to be adjacent to the first electrode stair 10 and having an area different from that of the first electrode unit of the first electrode stair 10 have the same length of side and the same angle of corner, not to give a step in the side and the angle. For example, sharing one side means that two adjacent electrode stairs 10, respectively, have a side having the same length, they are stacked such that the sides are consistent, thus not forming a step in the corners. In addition, sharing corners means that two adjacent electrode stairs 10, respectively, have a corner having the same angle, they are stacked such that the corners are consistent, thus not forming a step in the corners.

For example, an electrode laminate having steps in corners may be obtained by stacking electrode units such that at least two sides and three, two, or one corner are/is shared.

Figure 2:
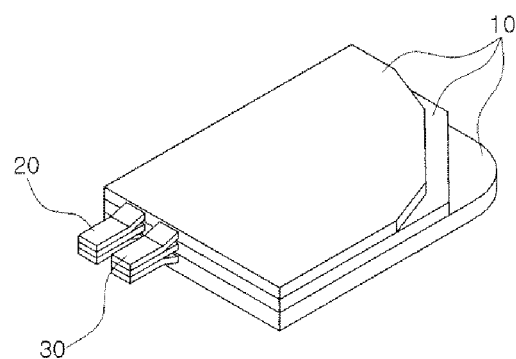
Figure 3:
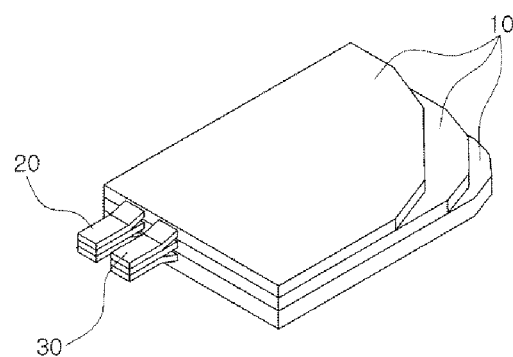

An example in which two sides and three corners are shared is illustrated in FIGS. 1 through 3. In the electrode assembly 1 illustrated in FIGS. 1 through 3, the side to which electrode tabs 20 and 30 are attached and a different side forming a corner in the end of the side are shared, the corner formed by the two sides and two respective corners adjacent to two sides are shared, and shapes of one corner which is not shared are different, thus forming steps, but the present invention is not limited thereto.

The shared sides and corners may be different as illustrated, and the corners forming steps may have various shapes other than those illustrated in FIGS. 1 through 3. For example, as mentioned above, the corners of the electrode units of the respective electrode stairs 10 are all rounded but since they have different curvatures, steps are formed.

Figure 4:
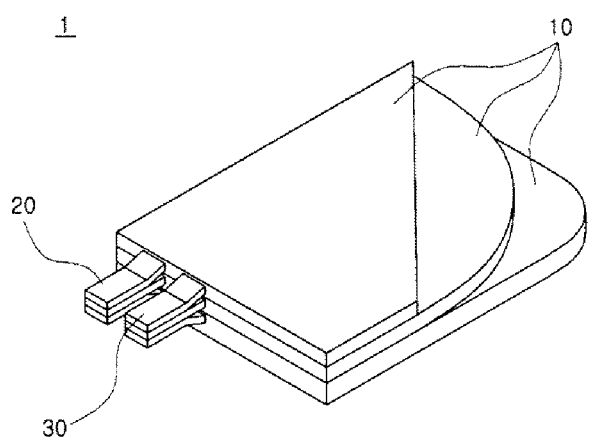
FIGS. 4 through 6 are perspective views of electrode assemblies in which at least two sides and at least two corners are shared and at least one corner has a step.
Figure 5:
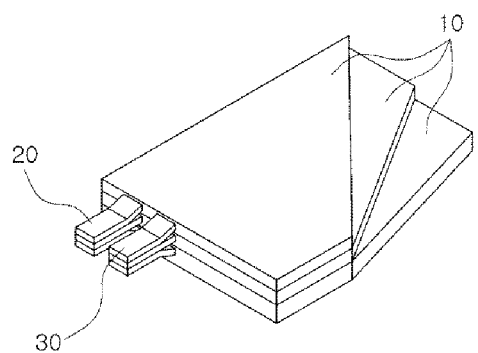
Figure 6:
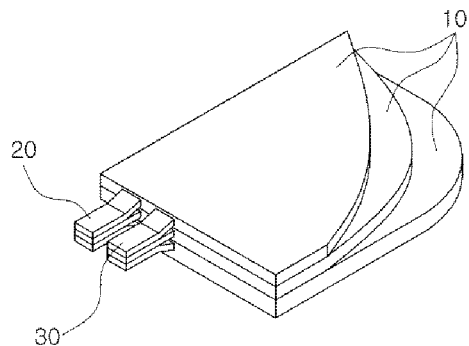
Figure 7:
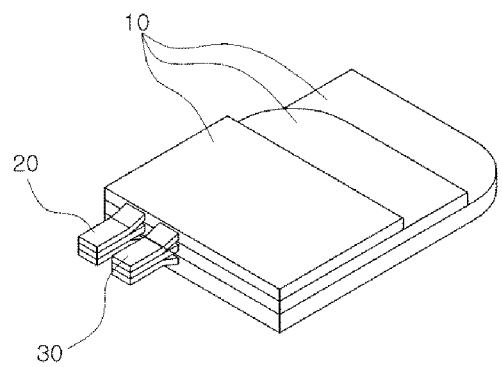
FIGS. 7 through 11 are perspective views of electrode assemblies in which at least one side and at least two corners are shared and at least one corner has a step.
Figure 8:
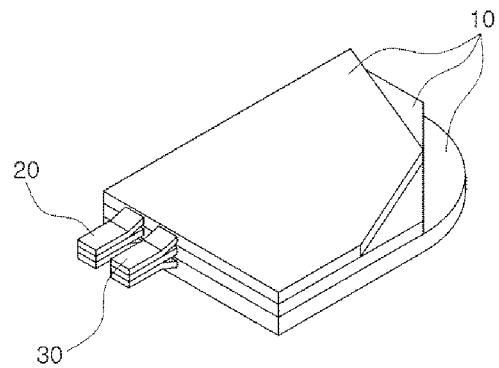
Figure 9:
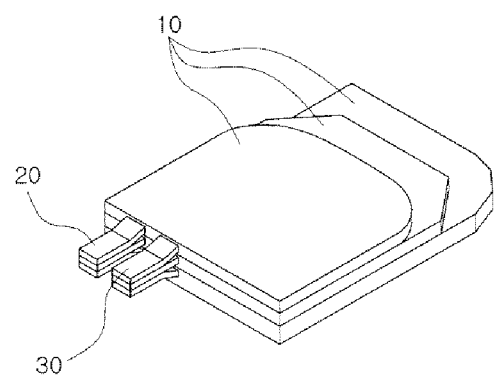
Figure 10:
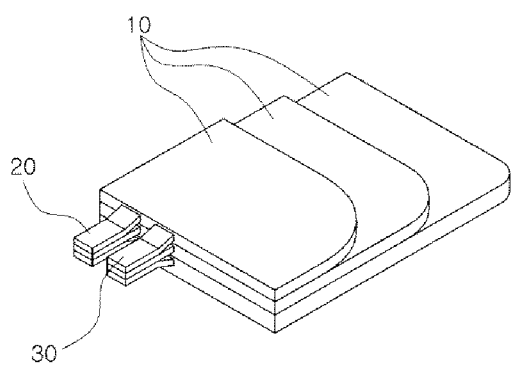
Figure 11:
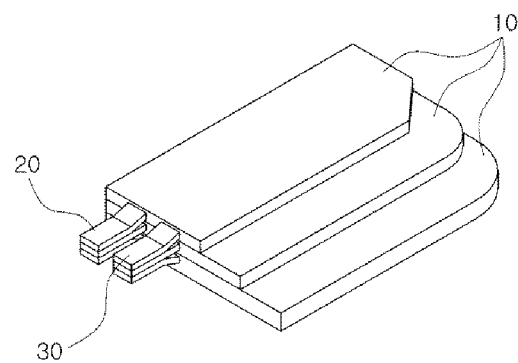
Figure 12:
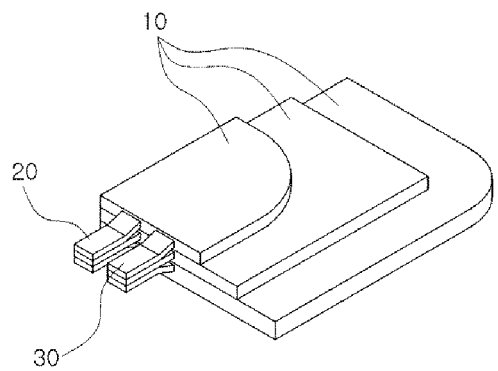
FIGS. 12 through 16 are perspective views of electrode assemblies in which at least one corner is shared and at least one corner has a step.
Figure 13:
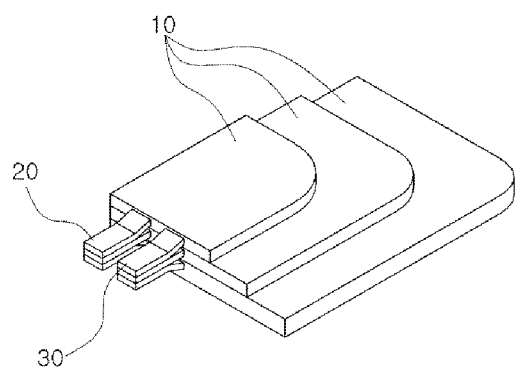
Figure 14:
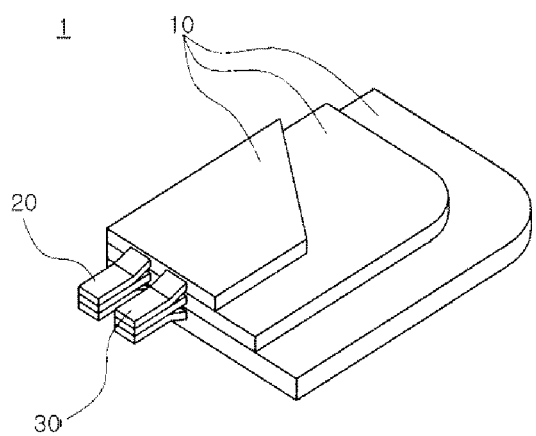
Figure 15:
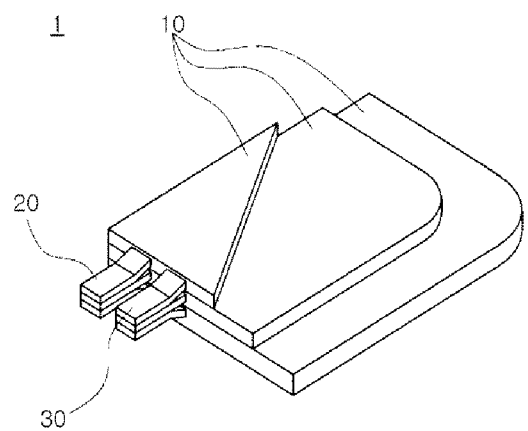
Figure 16:
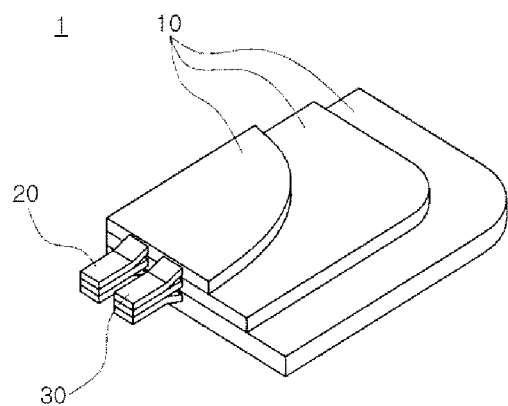

An example in which two sides and two corners are shared is illustrated in FIGS. 4 through 6. In the electrode assembly 1 illustrated in FIGS. 4 through 6, the side to which electrode tabs 20 and 30 are attached and a different side forming a corner in the end of the side are shared, two corners adjacent to the side to which the electrode tabs 20 and 30 are attached are shared, and steps are formed in an unshared region. The shared sides and corners may be different from those illustrated in the drawings and the corners forming steps may have various shapes other than those illustrated in FIGS. 4 through 6.

Meanwhile, an example in which two sides and one corner are shared is not illustrated, but the electrode assembly 1 in which electrode stairs 10 by the electrode units having one side having a certain shape in which two corners facing one another in a diagonal direction are connected are stacked to share two sides and a corner interposed therebetween may be obtained.

Also, in the electrode assembly 1 according to an embodiment of the present invention, a step may be formed while one side and two corners are shared. For example, the electrode assembly 1 having a structure illustrated in FIGS. 7 through 11 may be obtained. The sharing form and the shape of the corner may be variously modified and not limited to those illustrated in the drawings. In addition, although not shown, the electrode assembly 1 may have steps as electrode stairs 10 are stacked to share at least one side and one corner.

Meanwhile, as illustrated in FIGS. 12 through 16, by stacking the electrode stairs such that one corner is shared, the electrode assembly 1 having steps may be obtained. In this case, the shared corner may be appropriately selected and the corner may be variously formed. Also, shapes of one corner may be different or shapes of two or more corners may be different.

Figure 17:
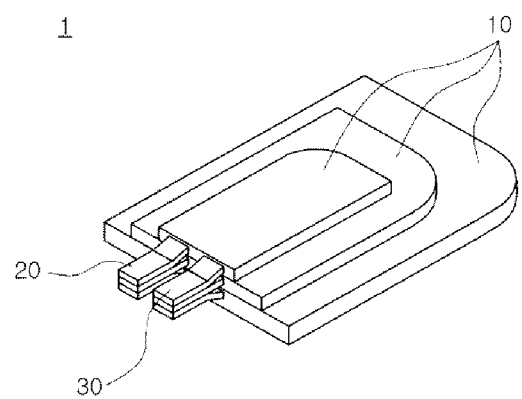
FIGS. 17 and 18 are perspective views of electrode assemblies in which portions of at least one corner are shared and all corners thereof have steps.
Figure 18:
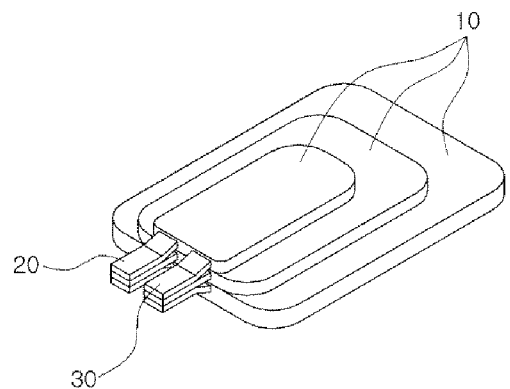
Figure 19:
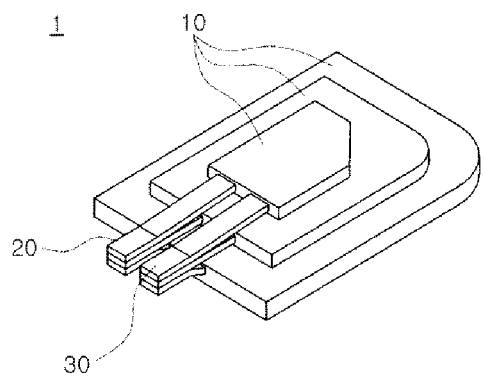
FIG. 19 is a perspective view of an electrode assembly having steps based on differences in areas, in which an electrode having a smaller area is stacked to be completely included in an electrode having a greater area and all corners thereof and all the sides have steps.
Figure 20:
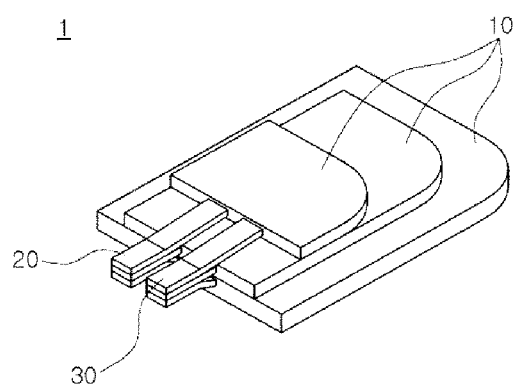
FIG. 20 is a perspective view of an electrode assembly in which shared portions are different according to stacked electrode stairs.

In addition, as illustrated in FIGS. 17 and 18, the electrode assembly 1 according to an embodiment of the present invention, the electrode stairs may be stacked to only share a portion of one side, and as illustrated in FIG. 19, one electrode stair 10 and the other electrode stair 10 are stacked such that a stacked surface of the electrode stair 10 having a smaller area is completely included in a stacked surface of the electrode stair 10 having a larger area and such that an electrode surface coated with an electrode active material and the other electrode surface face each other by a separator as a boundary, thus having steps in all the sides and corners. Meanwhile, FIG. 20 illustrates an example in which partial sides are shared in relation to the electrode stair 10 and the adjacent electrode stair 10 forming respective steps, and stacked form of the electrode stairs 10 forming the respective steps are different.

The drawings of the present invention illustrate the examples in which the sharing form of the sides and corners are the same in stacking the electrode units, but obviously, the electrode assembly 1 in which these examples are mixed may be obtained. For example, the first electrode stair 10 and the second electrode stair 10 may have the stacked form as illustrated in FIGS. 1 through 3, and the second electrode stair 10 and the third electrode stair 10 may have the stacked form as illustrated in FIGS. 4 through 6.

Also, in an embodiment of the present invention, the electrode assembly 1 in which the electrode units are stacked such that sizes thereof are sequentially reduced in a thickness direction is illustrated as an example. However, the present invention is not limited thereto and the electrode units may be stacked such that sizes thereof are sequentially increased in the thickness direction, or may be stacked such that sizes thereof are sequentially increased and subsequently reduced. The electrode units may be symmetrical or asymmetrical. Besides, the electrode assembly 1 having various other shapes may be obtained without being limited thereto.

In the electrode laminate according to an embodiment of the present invention, in the boundary region in which one electrode unit and an adjacent electrode unit having different areas face to form a step, facing electrodes of the two electrode units face such that electrodes having different polarities face in the boundary surface in which the two electrode units are stacked with the separator interposed therebetween as a boundary. In this manner, since different electrodes face one another, a battery reaction can be obtained even in the boundary portion forming a step, thus increasing a battery capacity.

In this case, the facing electrodes in the boundary portion forming a step may be disposed such that a facing electrode of the electrode unit having a larger area is disposed as a negative electrode. Namely, when the electrode units having different areas face each other with the separator interposed therebetween as a boundary in the electrode laminate, a portion of the stacked surface of the electrode unit having a larger area faces the outer side. In this case, when the electrode of the electrode unit facing the outer side is a positive electrode, lithium included in the positive electrode active material of the surface of the positive electrode is precipitated from the surface of the positive electrode to shorten a life span of the battery or degrade stability of the battery.

This preferably, the outermost electrode of the electrode assembly 1 is a negative electrode. In this case, preferably, a separator is stacked on an outer side of the negative electrode such that the separator is positioned on the surface of the electrode assembly 1. Meanwhile, a positive electrode may be disposed as the outermost electrode of the electrode assembly 1 but, in this case, the positive electrode may be a one-side coated positive electrode such that an outer surface thereof is not coated with a negative electrode active material, namely, remaining as an uncoated region.

Also, in the electrode assembly 1 according to an embodiment of the present invention, the electrode units include the negative electrode tab 20 and/or the positive electrode tab 30. When the electrode unit is a unit cell, it includes both the negative electrode tab 20 and the positive electrode tab 30, and when the electrode unit is configured as an individual electrode, it only includes one electrode tab 20 or 30. After the electrode tabs 20 and 30 are inserted into a battery case, electrodes having the same polarity are electrically connected.

Positions to which the electrode tabs 20 and 30 are attached may be variously selected. The electrode tabs 20 and 30 having two polarities may be formed in one end portion of the electrode units and the electrode units may be stacked such that the electrode tabs 20 and 30 face in the same direction, whereby the electrode tabs 20 and 30 may be protruded from a single surface of the electrode assembly 1 as illustrated in FIGS. 1 through 20. Also, the electrode tabs 20 and 30 may be protruded from two respective lateral surfaces of the electrode assembly 1, as illustrated in FIG. 20.

In this case, in order to allow the electrode tabs 20 and 30 to be easily electrically connected after being inserted into the battery case, the electrode units may be disposed such that the electrodes having the same polarity overlap with each other.

Meanwhile, when the steps are formed as illustrated in FIGS. 19 and 20 and the electrode tabs 20 and 30 of the electrode assembly 1 are attached, the electrode tabs 20 and 30 come in contact with the electrode unit having a larger area, negatively affecting battery stability. Thus, preferably, a contact between the electrode tabs 20 and 30 and the electrode unit is prevented, and according to circumstances, the surfaces of the electrode tabs 20 and 30 may be coated with an insulating resin, or the like, to prevent the contact.

Figure 21A:
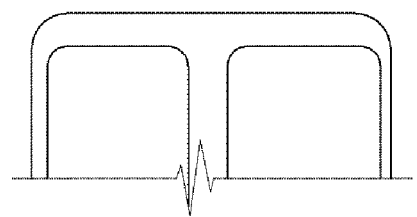
FIG. 21 is a view illustrating a stacked form of electrode tabs according to an embodiment of the present invention, in which (a) is a plan view and (b) is a front view.
Figure 21B:
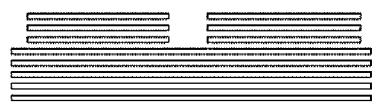

The shape of the electrode tabs 20 and 30 is not particularly limited and the areas of the electrode tabs 20 and 30 may be varied. For example, the electrode tabs 20 and 30 may have the same width and length or at least one of them may be different. Also, by using the electrode tabs 20 and 30 having various sizes, two or more electrode tabs having a smaller area may be stacked in two or more parallel lines. FIG. 21 shows an example of a stacked form of electrode tabs having different areas.

In this case, a sloped surface may be formed such that a shape of the electrode case 120 in which the electrode assembly 1 is received corresponds to a sloped surface of the separator. In this case, preferably, a space more than necessary may be occupied, so the separator may be tightly attached to each surface of the electrode assembly 1 in terms of space utilization. Thus, when the separator is separated from the electrode assembly 1, the separator may be heated or pressed so as to be elongated to be tightly attached. In this case, the stepped portion may include a bent portion. Also, in the stepped portion, the separator may be cut so as to be tightly attached to each surface of the electrode assembly 1.

Figure 22:
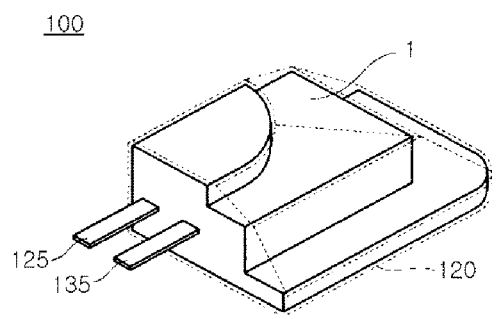
FIG. 22 is a view schematically illustrating a pouch-type rechargeable battery including an electrode assembly according to an embodiment of the present invention.

Hereinafter, a secondary battery according to an embodiment of the present invention will be described. FIG. 22 illustrates a secondary battery 100 according to an embodiment of the present invention. As illustrated in FIG. 22, in the secondary battery 100 according to an embodiment of the present invention, the electrode assembly 1 according to an embodiment of the present invention is installed in the battery case 120. In this case, the battery case 120 may be a pouch-type case.

The pouch-type case may be made of a laminate sheet and, in this case, the laminate sheet may include an outer resin layer forming the outermost portion, a blocking metal layer preventing penetration of a material, and an inner resin layer for hermetical sealing, but the present invention is not limited thereto.

Also, the battery case 120 may have a structure in which electrode leads 125 and 135 for electrically connecting electrical stairs of the electrode units of the electrode assembly 1 are exposed to the outside. Although not shown, an insulating film may be attached to upper and lower surfaces of the electrode leads 125 and 135 in order to protect the electrode leads 125 and 135.

Also, the battery case 120 may have various shapes according to the shape of the electrode assembly 1. The shape of the battery case 120 may be formed by deforming the battery case 120 itself. In this case, the shape and size of the battery case 120 may not necessarily correspond to the shape and size of the electrode assembly 1. Namely, battery case 120 may have a shape and size sufficient to prevent an internal short circuit due to a thrust phenomenon. Meanwhile, the shape of the battery case 120 is not limited thereto and the battery case having various shapes and sizes may be used as necessary.

For example, although not shown, a step may be formed in the battery case 120 according to the shape of the electrode assembly 1 having a step. In addition, as illustrated in FIG. 22, the battery case 120 may have a sloped surface as the surface in which the step of the electrode assembly 1 is formed. Namely, in the region in which the step of the electrode assembly 1 is formed, the battery case 120 is tightly attached to the upper corners and the corners of the respective electrode stairs 10 to thus form the sloped surface. Such a sloped surface may include a curved surface, and the sloped surface may have a slope equal to 2 units or greater.

Figure 23:
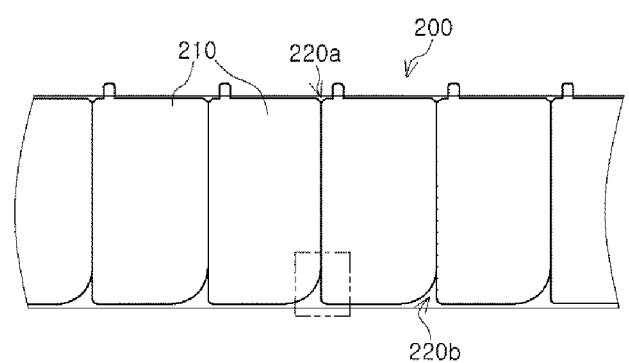
FIGS. 23 and 24 are views of a sheet of material from which a plurality of electrodes are cut in accordance with the prior art.
Figure 24:
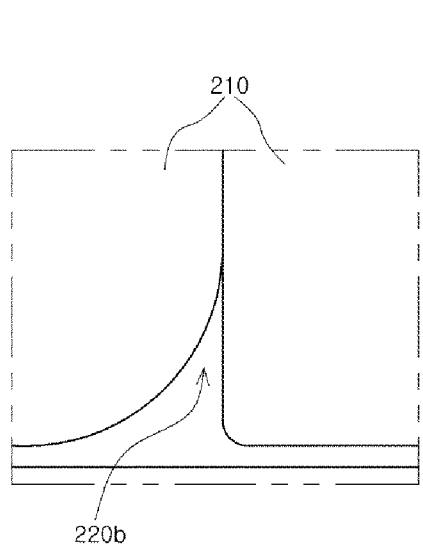

The electrodes used in the electrode assemblies of the present battery cell are typically formed by cutting a plurality of the electrodes from a single electrode sheet, such as electrode sheet 200 shown in FIG. 23. Each of electrodes 210 is spaced along a width direction of electrode sheet 200 such that each electrode 210 abuts the next in order to minimize wasted material. Sheet 200 is notched at locations 220a and 220b before the electrodes 210 are separated. Location 220b is shown more clearly in FIG. 24. Notching is typically done by either laser cutting, manually machining, or punching the sheet.

However, as electrodes 210 are separated, which is also typically done by laser cutting, the precision with which the laser must cut can lead to inaccuracies in the configurations of the electrodes 210. That is, if the machine does not cut sheet 200 along the exact edge of the adjacent electrodes 210, the final configuration of one electrode 210 may erroneously include a portion of the adjacent electrode 210.

Figure 25:
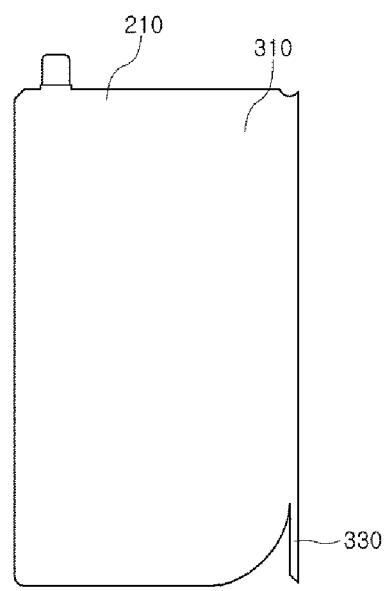
FIG. 25 is a view of an electrode having an edge protrusion resulting from an inefficient manufacturing method of the prior art.

Such an erroneously formed electrode is shown in FIG. 25 as electrode 310. An edge protrusion 330 is formed at a perimeter of electrode 310 due to an edge portion of the adjacent electrode from the sheet accidentally being included because of the misaligned cut. In addition, the notched electrode sheet can suffer from tears at the intersection of adjacent electrodes (that is, at the asymmetric rounded corner in FIGS. 23 and 24) due to stress concentrations in the electrode material.

Figure 26:
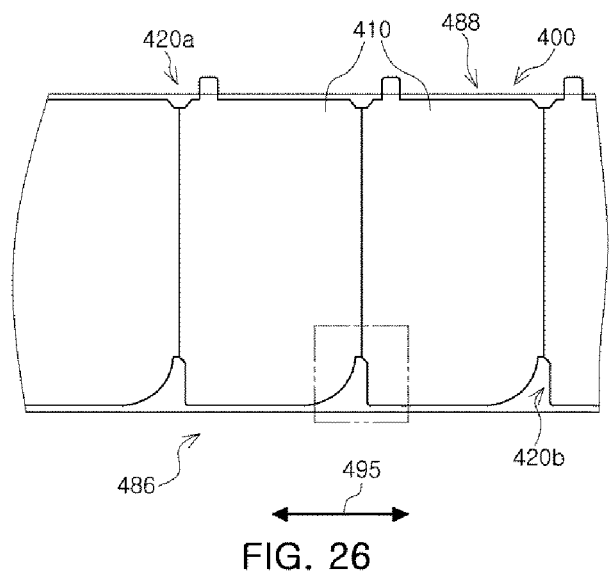
FIGS. 26 and 27 are views of a sheet of material from which a plurality of electrodes are cut in accordance with the present invention.
Figure 27:
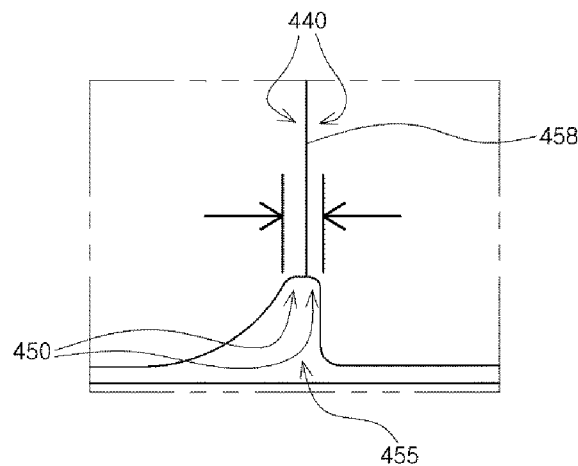

To avoid the occurrence of edge protrusions as shown in FIG. 25, an electrode sheet 400 can be provided as shown in FIGS. 26 and 27. Each of electrodes 410 is spaced along a width direction of electrode sheet 400 to include an extension 440 of each electrode 410 along the width direction of electrode sheet 400 after sheet 400 is notched at locations 420a and 420b before the electrodes 410 are separated. Each extension 440 is basically and outward protrusion of that portion of the edge of each electrode 410. This provides a flat area 450 extending in a substantially horizontal direction along the width direction of electrode sheet 400. In this way, each electrode 210 still abuts the next in order to minimize wasted material. To prevent abrasion of the notching tool at the pinnacle, it is preferable to have a minimum of four (4) millimeters of flat area when measured along the width direction of electrode sheet 400.

Figure 28:
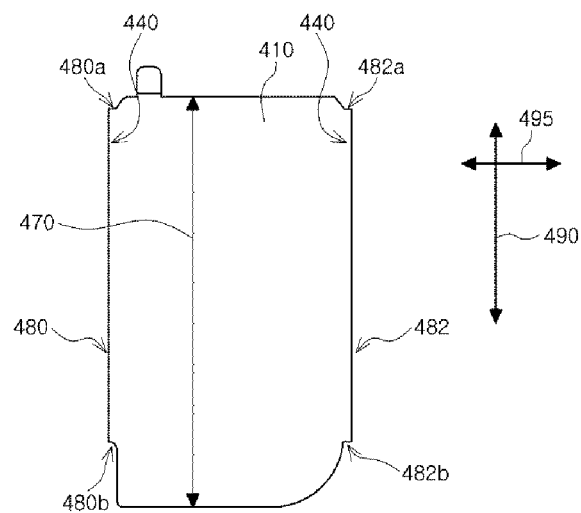
FIG. 28 is a view of an electrode resulting from a manufacturing method of the present invention.

Once electrode 410 is separated from the others in sheet 400, it appears as shown in FIG. 28. Two extensions 440 are incorporated into its final perimeter, which can be taken into account in the final configuration of the electrode assembly to be assembled. Electrode 410 has an asymmetric structure and is formed from a planar sheet of material having a generally rectangular perimeter. At least one corner 460 of the perimeter has an asymmetric structure with respect to a central axis normal to electrode 410, which is normal to the page showing FIG. 28. Electrode 410 extends along a length direction 490 and a width direction 495. A maximum length 470 along the length direction 490 is defined by electrode 410. Electrode 410 also defines first and second linear edges 480, 482 spaced apart along width direction 495. Each of first and second linear edges 480, 482 is shorter than maximum length 470.

The perimeter of electrode 410 at endpoints 480a, 480b of the first linear side 480 and at endpoints 482a, 482b of the second linear side 482 extends toward the opposing linear side in a direction substantially parallel to width direction 495. Thus, endpoints 480a, 480b, 482a, 482b extend toward the opposing side 480 or 482 in a generally horizontal direction, making up flat areas 450. One extension 440 is therefore comprised of first linear side 480 and the two adjacent flat areas 450, and the second extension 440 is comprised of second linear side 482 and the two adjacent flat areas 450. Of course, flat areas 450 are described and shown herein to be substantially horizontal and extending along width direction 495. However, areas 450 can be curved or otherwise configured to accommodate extension 440 extending away from the remainder of the electrode 410 as described above.

Each extension 440 protrudes away from the remainder of electrode 410, and each protrusion 440 extends away from the other. Each of the extensions 440 forms an abrupt change in the perimeter of electrode 410. That is, each extension including a linear side and two adjacent flat areas intersects the remainder of the perimeter at the junction of the perimeter and the two flat areas. These junctions form abrupt changes in the perimeter, for example, by a sharp curve or corner. The angle of the sharp curve or corner is in the range of about 30 to 150 degrees, or more specifically in the range of about 60 to 120 degrees, or more specifically at about ninety degrees. Stated another way, when compared to a perimeter of a hypothetical electrode similar to that of electrode 410 but without extensions 440, the present electrode 410 includes extensions 440 that define a perimeter protruding outward from the perimeter of the hypothetical electrode A method of manufacturing electrode 410 can begin by providing a planar sheet of material, such as sheet 400, extending along width direction 495 and having top and bottom edges 486, 488. Notches 455 can then be removed from sheet 400 along one of the top and bottom edges 486, 488 at locations between adjacent electrodes to ultimately be formed from sheet 400. As shown in FIG. 27, notch 455 is formed at first edge 486. Of course additional notches are provided at second edge 488, as shown in FIG. 26.

Each notch 455 defines a perimeter including a portion of the top or bottom edge 486, 488 from which it is cut, a portion corresponding to a perimeter of a first adjacent electrode, and a portion corresponding to a perimeter of a second adjacent electrode. In FIG. 27, the first electrode is on the left and the second electrode is on the right. The perimeter of notch 455 includes a horizontal portion extending along a direction parallel to width direction 495 at a junction of the first and second electrodes. This horizontal portion is shown in FIG. 27 as comprising both flat portions 450, with one flat portion 450 being disposed on each of the first and second electrodes. The flat portions 450 are joined at the junction between the two electrodes.

A next step in the method includes separating the first and second electrodes along a line perpendicular to and intersecting the horizontal portion of the notch, such line shown in FIG. 27 as line 458. Of course, line 458 coincides with the first linear side 480 of one of the electrodes and the second linear side 482 of the other one of the electrodes.

In an alternative method, edge protrusions as described above can be avoided during manufacture by using a punching process instead of a notching process. However, this requires the new concept notching and lamination equipment.

An additional way to avoid edge protrusions in the manufactured electrodes is to complete the entire process with a laser as opposed to employing a notching technique. The laser is used to remove the notched portion. Both of the lasers that cut opposing sides (or alternatively the single laser used to cut the opposing sides at different times) must be synchronized along the width direction of the electrode sheet to ensure uniformity.

The secondary battery 100 according to an embodiment of the present invention may be a lithium ion battery or a lithium ion polymer battery, but the present invention is not limited thereto.

The secondary battery 100 according to an embodiment of the present invention may be used alone or a battery pack including one or more secondary batteries 100 may be used. The secondary battery and/or the battery pack according to an embodiment of the present invention may be advantageously used in various devices, for example, a portable phone, a portable computer, a smart phone, a smart pad, a net book, a light electronic vehicle (LEV), an electric vehicle, a hybrid electric vehicle, a plug-in hybrid electric vehicle, a power storage device, and the like. The structures of these devices and fabrication methods thereof are known in the art, so a detailed description thereof will be omitted.

Meanwhile, when the secondary battery or the battery pack is installed in the foregoing devices, a system component of the devices may be positioned in a surplus space formed due to the structure of the secondary battery or the battery pack. In an embodiment of the present invention, since the secondary battery or the battery pack is formed as the electrode assembly 1 having a different size, the electrode assembly 1 itself is formed to have a step. Thus, when the battery case is formed according to the shape of electrodes and installed in the devices, surplus space, which is not provided in the conventional prismatic or oval secondary battery or battery pack, is formed.

When a system component of the device is installed in the surplus space, the system component of the device and the secondary battery or the battery pack can be flexibly disposed, enhancing space utilization and reducing an overall thickness or volume of the device to implement a slim design.

The invention claimed is:

1. An electrode having an asymmetric structure, comprising:
   a planar sheet of material having a first end and an opposed second end, and
   a tab extending away from the first end of the planar sheet,
   wherein the planar sheet has a generally rectangular perimeter, with at least one corner of the perimeter having an asymmetric structure with respect to a central axis normal to the planar sheet,
   wherein the planar sheet extends along a length direction, extends along a width direction, defines a maximum length along the length direction, and defines first and second linear edges spaced apart along the width direction, each of the first and second linear edges being shorter than the maximum length,
   wherein the first and second linear edges each include a first endpoint adjacent the first end of the planar sheet and a second endpoint adjacent the second end of the planar sheet,
   wherein the perimeter of the planar sheet at the first and second endpoints of each of the first and second linear edges extends toward the opposing linear edge in a direction substantially parallel to the width direction, and
   wherein a depth of the first endpoints measured from the first end of the planar sheet is smaller than a depth of the second endpoints measured from the second end of the planar sheet.

2. The electrode of claim 1, wherein the tab extends along the length direction away from the one end of the planar sheet.

3. An electrode having an asymmetric structure, comprising:
   a planar sheet of material having a first end, an opposed second end, and a generally rectangular perimeter, with at least one corner of the perimeter having an asymmetric structure with respect to a central axis normal to the electrode,
   wherein the electrode extends along a length direction, extends along a width direction, defines a maximum length along the length direction, and defines first and second linear edges spaced apart along the width direction, each of the first and second linear edges being shorter than the maximum length,
   wherein the first and second linear edges each include a first endpoint adjacent the first end of the planar sheet and a second endpoint adjacent the second end of the planar sheet,
   wherein the perimeter of the electrode at the first and second endpoints of each of the first and second linear edges first extends toward the opposing linear edge in a first direction substantially parallel to the width direction, and then extends in a second direction that is angled with respect to the first direction, and
   wherein a depth of the first endpoints measured from the first end of the planar sheet is smaller than a depth of the second endpoints measured from the second end of the planar sheet.

4. An electrode having an asymmetric structure, comprising:
   a planar sheet of material having a first end, an opposed second end, and a generally rectangular perimeter including four edges and four corners each connecting a pair of the edges, each corner having a notched perimeter extending inward from the edges toward a central axis normal to the electrode, at least one of the notched perimeters having an asymmetric structure with respect to the central axis different from the asymmetric structure of another one of the notched perimeters,
   wherein the electrode extends along a length direction, extends along a width direction, defines a maximum length along the length direction, and defines first and second linear edges spaced apart along the width direction, each of the first and second linear edges being shorter than the maximum length,
   wherein the first and second linear edges each include a first endpoint adjacent the first end of the planar sheet and a second endpoint adjacent the second end of the planar sheet,
   wherein the perimeter of the electrode at the first and second endpoints of each of the first and second linear edges extends toward the opposing linear edge in a direction substantially parallel to the width direction, and
   wherein a depth of the first endpoints measured from the first end of the planar sheet is smaller than a depth of the second endpoints measured from the second end of the planar sheet.

5. The electrode of claim 4, wherein the first linear edge extends between the notched perimeters of two adjacent corners.

6. The electrode of claim 1, wherein the perimeter of the planar sheet at the first and second endpoints of each of the first and second linear edges includes linear portions extending toward the opposing linear edge.

7. The electrode of claim 6, wherein the first and second endpoints of each of the first and second linear edges form corners between the respective linear edges and the respective linear portions.

8. The electrode of claim 7, wherein the angle of each of the corners is about ninety degrees.

9. An electrode assembly comprising:
   a first electrode stair including at least one first electrode unit; and
   a second electrode stair including at least one second electrode unit having an area different from that of the first electrode unit,
   wherein the first electrode stair and the second electrode stair are stacked to be adjacent, separated by at least one separator as a boundary therebetween and including one or more electrode laminates having steps formed by a difference between the areas of the first electrode stair and the second electrode stair, shapes of corners of the first electrode stair and the second electrode stair are different, wherein at least one of the electrode units is the electrode according to claim 1.

10. The electrode assembly of claim 9, wherein at least one of the first and second electrode stairs forming the electrode laminate has a rounded corner forming a step.

11. The electrode assembly of claim 9, wherein the first electrode stair and the second electrode stair forming the electrode laminate have rounded corners forming steps, and curvatures of the rounded corners are different.

12. The electrode assembly of claim 9, wherein, in the electrode laminate, the first electrode stair and the second electrode stair share at least two sides and three corners.

13. The electrode assembly of claim 9, wherein, in the electrode laminate, the first electrode stair and the second electrode stair share at least two sides and two corners.

14. The electrode assembly of claim 9, wherein, in the electrode laminate, the first electrode stair and the second electrode stair share at least one side and two corners.

15. The electrode assembly of claim 9, wherein, in the electrode laminate, the first electrode stair and the second electrode stair share at least one side and one corner.

16. The electrode assembly of claim 9, wherein, in the electrode laminate, the first electrode stair and the second electrode stair share at least one corner.

17. The electrode assembly of claim 9, wherein, in the electrode laminate, the first electrode stair and the second electrode stair share only a portion of one side.

18. The electrode assembly of claim 9, wherein, in the electrode laminate, the first electrode stair is stacked within a surface of the second electrode stair, and all the sides and corners have steps.

19. The electrode assembly of claim 9, wherein, in the electrode laminate, the first electrode stair shares at least two sides of the second electrode stair, and has steps in all the sides and corners.

20. The electrode assembly of claim 9, wherein, in the electrode laminate, the electrode units are stacked such that the areas thereof are reduced in a height direction in which the electrode units are stacked.

21. The electrode assembly of claim 9, wherein, in the electrode laminate, one of mutually adjacent electrode units is included within a stacked surface of the other electrode unit.

22. The electrode assembly of claim 9, wherein the electrode units have electrode tabs corresponding to respective electrodes and the respective sizes of the electrode tabs are equal or different.

23. The electrode assembly of claim 22, wherein the electrode tabs are attached to one end portion of the electrode unit or facing end portions of the electrode unit.

24. The electrode assembly of claim 9, wherein the electrode unit is independently selected from the group including a negative electrode, a positive electrode, and a unit cell alternately stacked with at least one negative electrode and at least one positive electrode with a separator interposed therebetween.

25. The electrode assembly of claim 24, wherein the unit cell is selected from the group consisting of a jelly roll-type unit cell, a stacked-type unit cell, and a stacked-and-folded-type unit cell.

26. The electrode assembly of claim 25, wherein the unit cell includes at least one step.

27. The electrode assembly of claim 9, wherein, facing electrodes of the electrode unit and the adjacent electrode unit having different areas which face each other with the separator interposed therebetween as a boundary have different polarities.

28. The electrode assembly of claim 27, wherein a facing electrode of an electrode unit having a larger area, between the electrode unit and the adjacent electrode unit having different areas, is a negative electrode.

29. A secondary battery, wherein the electrode assembly of claim 9 is received in a battery case.

30. A device comprising one or more secondary batteries of claim 29.

31. The device of claim 30, wherein a system component of the device is positioned in a surplus space of the secondary battery.

32. The secondary battery of claim 30, wherein the device is a portable phone, a portable computer, a smart phone, a smart pad, a net book, a light electronic vehicle (LEV), an electric vehicle, a hybrid electric vehicle, a plug-in hybrid electric vehicle, or a power storage device.

* * * * *